Dec. 15, 1931.   S. B. HENDRICKS   1,836,168
MULTIPLE TRACTOR HITCH FOR FARM IMPLEMENTS
Filed March 22, 1930   4 Sheets-Sheet 1
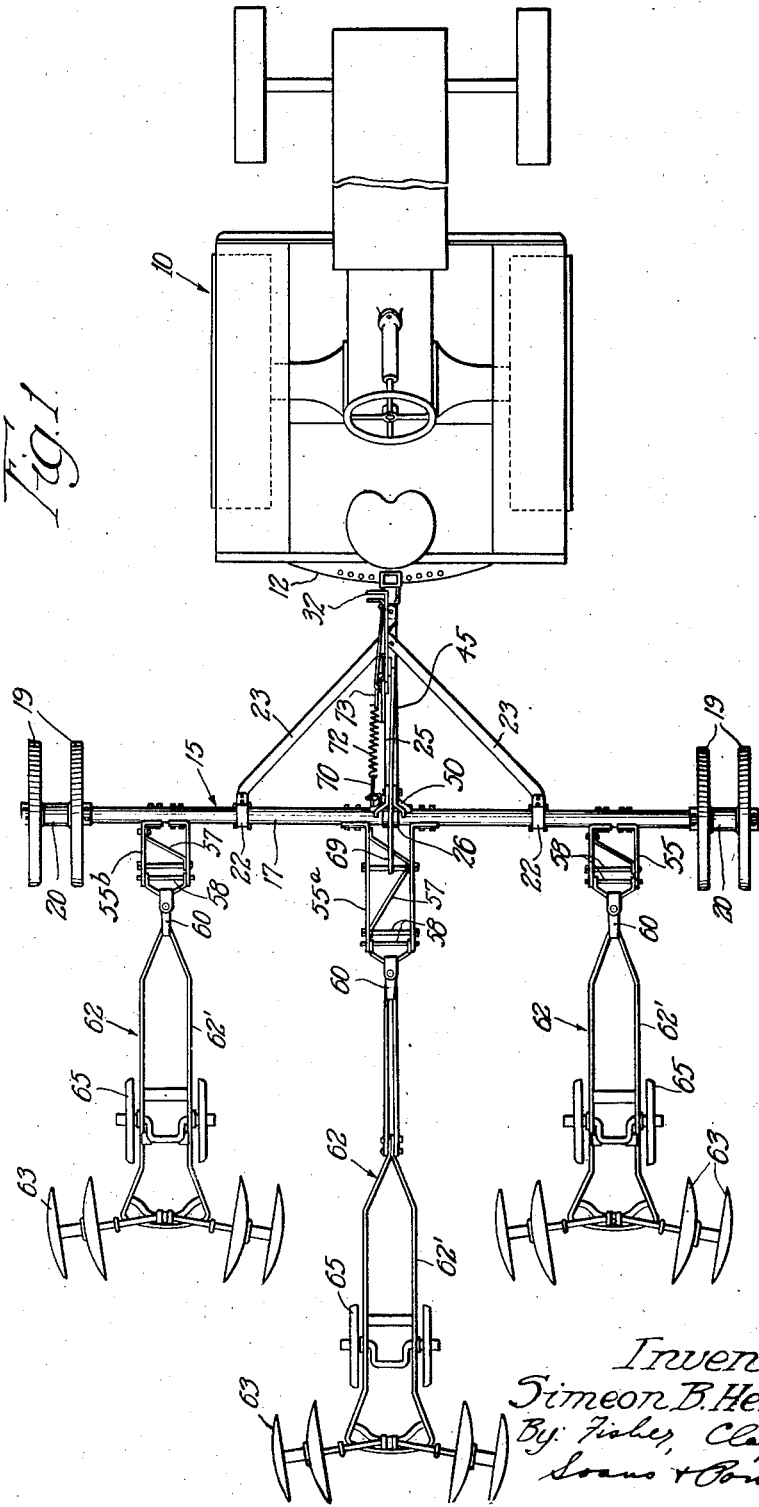

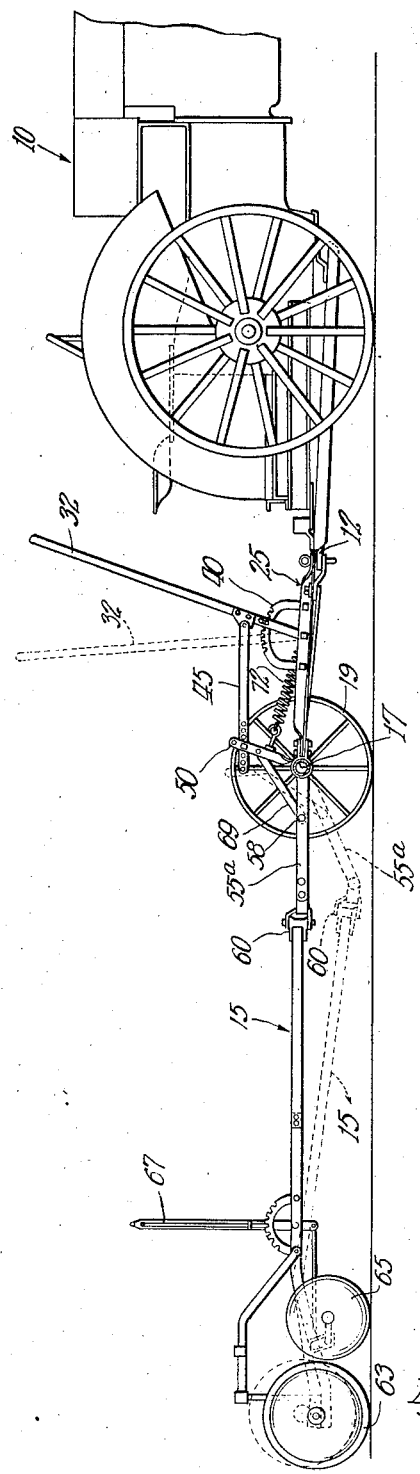

Dec. 15, 1931.  S. B. HENDRICKS  1,836,168
MULTIPLE TRACTOR HITCH FOR FARM IMPLEMENTS
Filed March 22, 1930  4 Sheets-Sheet 3
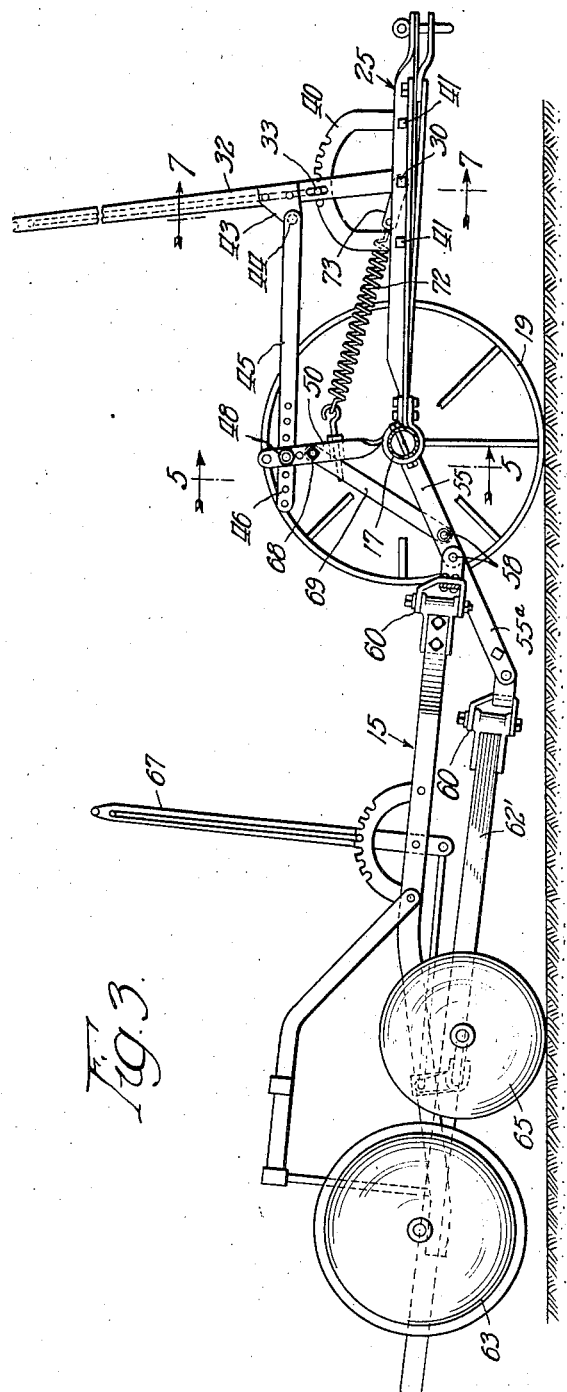
Inventor
Simeon B. Hendricks
By Fisher, Clapp, Soans & Pond,
Attys.

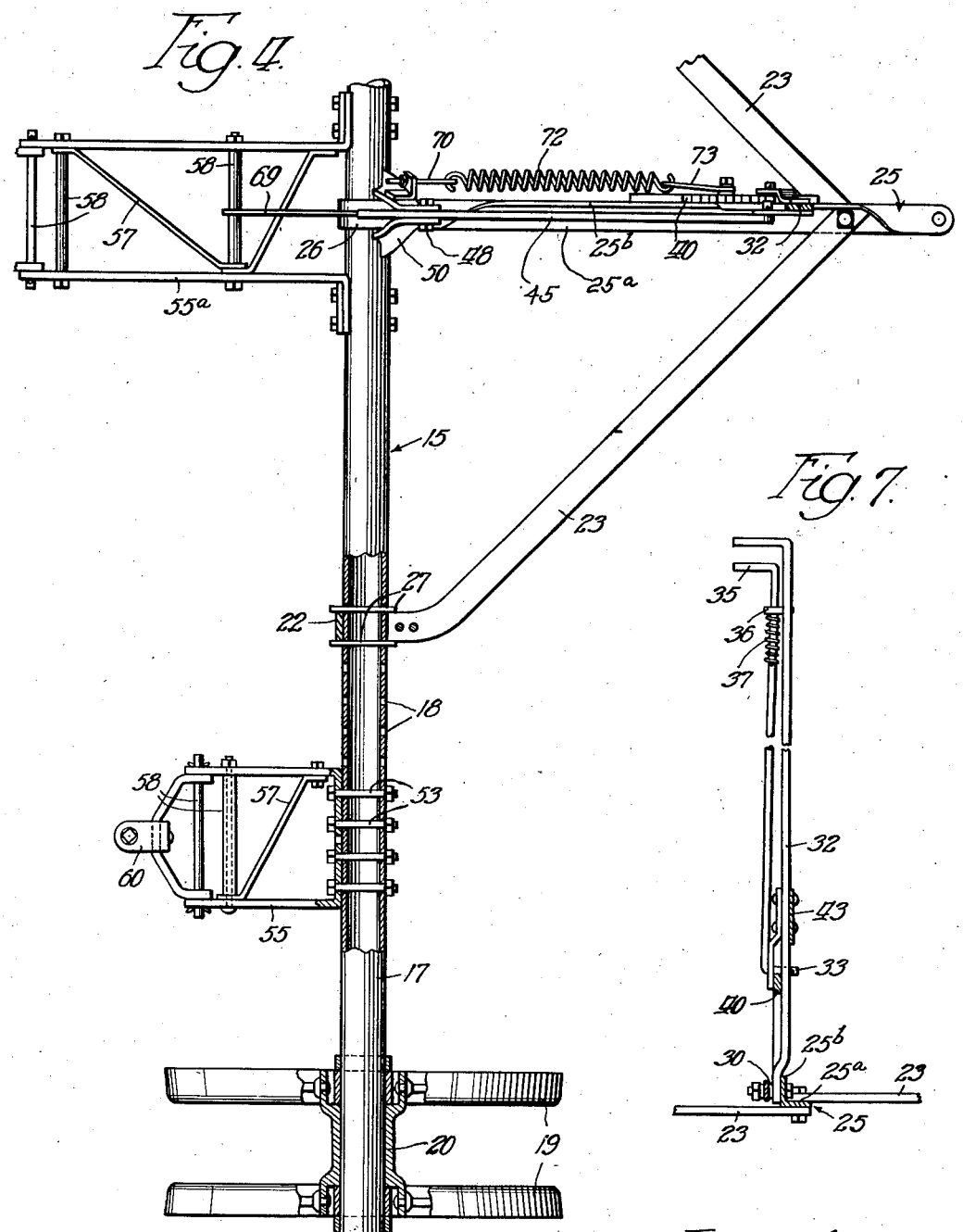

Patented Dec. 15, 1931

1,836,168

UNITED STATES PATENT OFFICE

SIMEON B. HENDRICKS, OF ROCKFORD, ILLINOIS, ASSIGNOR TO J. I. CASE COMPANY, OF RACINE, WISCONSIN, A CORPORATION OF WISCONSIN

MULTIPLE TRACTOR HITCH FOR FARM IMPLEMENTS

Application filed March 22, 1930. Serial No. 438,118.

My invention relates generally to farm implements and has to do more particularly with a multiple tractor hitch whereby a plurality of implements may be carried by means of a single hitch.

Still another object is to provide such a device which will be simple in construction, efficient in operation, and rugged.

Various other objects and advantages will become apparent to those skilled in the art as the description proceeds.

Referring now to the drawings forming part of this specification and illustrating a preferred embodiment of my invention:

Fig. 1 represents a top plan view of a device embodying my invention, shown in connection with a tractor to which it is hitched.

Fig. 2 is a side elevational view of the same.

Fig. 3 is a similar view on an enlarged scale, with the tools out of cooperative relation to the ground.

Fig. 4 is a fragmentary top plan view of a portion of the device on an enlarged scale.

Figure 5 is a sectional view taken on the line 5—5 of Fig. 3.

Fig. 6 is an elevational view partly in section showing a detail of the construction, and Fig. 7 is a sectional view taken substantially on the line 7—7 of Fig. 3.

In the drawings, the numeral 10 represents generally a tractor of any type suitable for drawing a farm implement over the ground and having adjacent its rear portion an apertured hitching plate 12.

Hitched to the tractor is a farm implement indicated generally at 15 comprising a transverse bar 17, which in the particular embodiment shown is formed of cylindrical tubing, as best shown in Fig. 4, and has a plurality of diametrically opposite apertures 18 therein. The bar 17 journals suitable wheels 19 which are carried on rotatable hubs 20. Secured to the bar 17 is a pair of sleeves 22, to each of which is bolted a bar 23, the bars 23 converging in a V formation and being secured at the apex of the V to a hitching bar 25. The hitching bar 25 is secured to the transverse bar 17 by means of a loop 26. The bars 23 may be prevented from sliding longitudinally of the bar 17 by means of pins 27 or the like passing through the bar 17, and the hitching bar 25 may if desired be similarly secured on the bar 17.

The hitching bar 25 is preferably angular in form, having a horizontal flange 25ª and a vertical flange 25ᵇ, (Fig. 7) and pivoted to the vertical flange as at 30 is a lever 32 carrying a spring-pressed dog 33 formed on a manipulating member 35. This manipulating member is secured to the lever 32 by means of a strap 36 and a helical compression spring 37 urges the member 35 and its dog 33 into cooperative relation with the notches of an arcuate rack 40 which may be bolted to the vertical flange of the hitching bar 25 as at 41.

Secured to the lever 32 is an ear 43 to which is pivoted as at 44 a link 45 having a plurality of apertures 46 therein. Pivotally secured in one of the apertures 46, as at 48, is a link 50, which is secured as by means of bolts 51 or the like to the tubular bar 17, as shown most clearly in Fig. 6.

A plurality of bolts 53 extend through certain of the apertures 18 in the bar 17 and serve to secure thereto substantially U-shaped hitching members 55, 55ª and 55ᵇ. While three such U-shaped members are shown in Fig. 1, it will be apparent that any desired number may be used, depending upon the work to be accomplished. These U-shaped hitching members may be reinforced as by means of struts 57 and transverse pins 58, and as shown best in Fig. 4, straps 60 may be attached to certain of these pins for connecting thereto the particular agricultural tool which is desired. These tools, as shown in Fig. 1 and indicated generally by the numeral 62, are disk harrows in the particular embodiment disclosed, having a centered draw bar 62' and having a plurality of disks 63 and wheels 65. The elevation of the disks may be varied in the usual manner by means of a lever 67. These agricultural tools may be of any type desired, and it is to be understood that instead of a disk harrow any other suitable agricultural tool may be substituted therefor.

Pivoted to the link 50, as at 68, is a link 69 which is pivoted at its other end to one of the cross pins 58 of the hitching member 55ᵃ. Also secured to the link 50 is a hook 70 to which is secured a tension helical spring 72 which in turn is connected to an apertured lug 73 attached to the tongue 25.

It is believed that the operation of the device will be readily apparent from what has gone before. Any number of desired farm tools may be secured to the hitching bar 17 by means of the apertures 18 provided therein. Furthermore, the driver of the tractor, without leaving his seat, may operate the lever 32 to bring the tools into or out of cooperative relation with the ground. Thus, when it is desired to draw the implement across a road or across ground which it is not desired to cultivate, the operator will move the lever 32 to the left in Figs. 2 and 3 so as to rotate the bar 17 about its axis in a counter-clockwise manner, as shown in Figs. 2 and 3. This will tend to rock the disks 63 up out of engagement with the ground, pivoting about the wheels 65 which will then roll over the ground. The disks or other tools may be brought back into engagement with the soil by moving the lever 32 in the opposite direction.

Many variations and modifications will doubtless be apparent to those skilled in the art without departing from the spirit of my invention, and hence I do not wish to be limited to the particular embodiment shown or uses mentioned, except as set forth in the appended claims, which are to be interpreted as broadly as is consistent with the state of the art.

I claim as my invention:

1. In a device of the class described, a transverse tubular bar having a plurality of apertures therein for connecting agricultural tools at various points thereto, rolling means journaled on said bar, means extending through said apertures for connecting said bar to a tractor or the like, and means for rotating said bar so as to bring said tools into and out of cooperative relation with the ground.

2. In a device of the class described, a transverse tubular bar having a plurality of apertures therein for connecting agricultural tools at various points thereto, rolling means journaled on said bar, means extending through said apertures for connecting said bar to a tractor or the like, and manually operable means accessible to a person operating said tractor for rotating said bar and thus bringing said tools into and out of cooperative relation with the ground.

3. In a device of the class described, a transverse tubular bar having a plurality of apertures therein for connecting agricultural tools at various points thereto, rolling means journaled on said bar, means extending through said apertures for connecting said bar to said agricultural tools, means connecting said bar to a tractor or the like, and means for rotating said bar so as to bring said tools into and out of operative relation with the ground.

SIMEON B. HENDRICKS.